US010189308B2

(12) United States Patent
Albl et al.

(10) Patent No.: US 10,189,308 B2
(45) Date of Patent: Jan. 29, 2019

(54) DRIVE DEVICE FOR A MOTOR VEHICLE AND MOTOR VEHICLE HAVING AT LEAST ONE DRIVE DEVICE

(71) Applicant: AUDI AG, Ingolstadt (DE)

(72) Inventors: Sebastian Albl, Gaimersheim (DE); Jürgen Schmitz, Karlshuld (DE); Stefan Hübler, Garching (DE); Albert Scharlach, Oberdolling (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/911,716

(22) Filed: Mar. 5, 2018

(65) Prior Publication Data
US 2018/0250982 A1 Sep. 6, 2018

(30) Foreign Application Priority Data

Mar. 6, 2017 (DE) .......................... 10 2017 203 587

(51) Int. Cl.
| | |
|---|---|
| *B60K 1/02* | (2006.01) |
| *B60B 35/12* | (2006.01) |
| *B60K 17/14* | (2006.01) |
| *B60K 7/00* | (2006.01) |

(Continued)

(52) U.S. Cl.
CPC .............. *B60B 35/124* (2013.01); *B60K 1/02* (2013.01); *B60K 7/0007* (2013.01); *B60K 17/04* (2013.01); *B60K 17/14* (2013.01); *B60K 2007/0038* (2013.01); *B60K 2007/0061* (2013.01);

(Continued)

(58) Field of Classification Search
CPC .......................... B60K 1/02; B60K 2001/0405
See application file for complete search history.

(56) References Cited

U.S. PATENT DOCUMENTS

| | | | | | |
|---|---|---|---|---|---|
| 4,046,211 | A | * | 9/1977 | Allen | ............... B60G 17/01916 180/215 |
| 5,927,417 | A | * | 7/1999 | Brunner | ................... B60K 1/02 180/65.6 |

(Continued)

FOREIGN PATENT DOCUMENTS

| | | |
|---|---|---|
| DE | 44 34 237 A1 | 3/1996 |
| DE | 29518401 U1 | 3/1997 |

(Continued)

OTHER PUBLICATIONS

German Search Report dated Dec. 4, 2017 of corresponding German application No. 10 2017 203 587.0; 5 pgs.

(Continued)

*Primary Examiner* — James A Shriver, II
*Assistant Examiner* — James J Triggs
(74) *Attorney, Agent, or Firm* — Maier & Maier, PLLC

(57) ABSTRACT

A drive device for a motor vehicle, having a first drive assembly, a second drive assembly, and a wheel axle having a first axle member and a second axle member. The axle members are arranged in the lengthwise direction relative to an axis of rotation of the first axle member and/or the second axle member, at least partially, on sides of the first drive assembly and the second drive assembly lying opposite to one another, and wherein the first axle member is coupled to the first drive assembly and the second axle member is coupled to the second drive assembly in order to transmit torque.

7 Claims, 3 Drawing Sheets

(51) Int. Cl.
*B60K 17/04* (2006.01)
*H02K 7/116* (2006.01)

(52) U.S. Cl.
CPC ..... *B60L 2220/46* (2013.01); *B60Y 2400/804* (2013.01); *H02K 7/116* (2013.01)

(56) References Cited

U.S. PATENT DOCUMENTS

| | | | |
|---|---|---|---|
| 7,611,432 B2* | 11/2009 | Maguire | B60K 6/40 475/5 |
| 2006/0225930 A1 | 10/2006 | Schulte | |
| 2009/0014223 A1* | 1/2009 | Jones | B60K 17/16 180/65.8 |
| 2013/0061703 A1* | 3/2013 | Teramoto | F16H 55/14 74/434 |
| 2017/0050514 A1* | 2/2017 | Li | B60K 17/14 |
| 2018/0112755 A1* | 4/2018 | Littlefield | B60K 6/40 |

FOREIGN PATENT DOCUMENTS

| | | |
|---|---|---|
| DE | 20 2009 014 490 U1 | 3/2010 |
| DE | 10 2010 010 438 A1 | 9/2011 |
| DE | 10 2010 017 966 A1 | 10/2011 |
| DE | 10 2010 020 576 A1 | 11/2011 |
| DE | 10 2010 062 227 A1 | 5/2012 |
| DE | 11 2012 001 601 T5 | 1/2014 |
| DE | 10 2015 103 906 A1 | 9/2016 |
| WO | 2013/057257 A2 | 4/2013 |

OTHER PUBLICATIONS

Search Report dated Jul. 12, 2018 in corresponding European Application No. 18157060.7 ; 9 pages.

* cited by examiner

DRIVE DEVICE FOR A MOTOR VEHICLE AND MOTOR VEHICLE HAVING AT LEAST ONE DRIVE DEVICE

FIELD

The invention relates to a drive device for a motor vehicle. In addition, the invention relates to a motor vehicle having at least one drive device.

BACKGROUND

Typically, electric drive devices for driving motor vehicles are installed on the front and/or rear axle(s) of the vehicle with the axis of rotation of the drive assembly and crosswise to the direction of travel. A motor vehicle is understood to be, in particular, a passenger vehicle or a commercial vehicle. This arrangement leads to a high packing space requirement, whereby a distribution of power and/or torque is limited, in particular, since a necessary additional structural or packing space is not available for a suitable transmission. The packing space available can in fact be increased by the use of axles with struts or shocks, but disadvantages result, such as, for example, a reduced loading width in the packing space, difficulties in realizing a convertible or station wagon version of the motor vehicle, as well as increased manufacturing costs. Overall, the implementation of dual drives on one axle, for example, for realizing a torque distribution (torque vectoring), in the case of this arrangement of the axle drives is difficult or—particularly for smaller vehicle classes—possible only with obvious power losses.

For example, the publication DE 44 34 237 A1 is known from the prior art. This relates to a vehicle axle with electric single-wheel drives, with which overstressing shall be prevented over longer periods of time in the case of unequal loading of the drive wheels of the vehicle axle of one of the single-wheel drives. Further, an over-dimensioning of the single-wheel drive shall be avoided. It is proposed for this to provide a clutch, by way of which single-wheel drives can be joined together in a force fit. The clutch can be actuated by a control, so that it engages automatically and joins together the two single-wheel drives in a force fit, as long as there is no falling below a predeterminable steering angle of the vehicle, and/or a different loading of the single-wheel drives is present.

In addition, the publication DE 10 2010 010 438 A1 shows a chassis for a motor vehicle, having an electric axle, which has two electric machines, wherein in the region of each end of the electric axle, a wheel is rotatably mounted, and each wheel can be driven by means of this associated electric machine, as well as with a reduction gear arranged between the respective electric machine and the wheel associated therewith. It is provided thereby that the respective reduction gear is linked by way of a linking shaft to the wheel associated with this reduction gear, and the respective axes of rotation of the two electric machines are arranged parallel next to one another.

In addition, the publication DE 11 2012 001 601 T5 describes a rear-wheel drive device, the publication DE 10 2010 017 966 A1 describes a vehicle with electric drive, the publication DE 10 2015 103 906 A1 describes an electric drive train, and the publication DE 10 2010 020 576 A1 describes an electric drive system for a motor vehicle.

SUMMARY

The object of the invention is based on creating a drive device for a motor vehicle and a motor vehicle having at least one drive device, wherein the necessary packing space for the drive device is reduced in an advantageous way when compared to known drive devices and motor vehicles.

The object is achieved, in particular, by creating a drive device for a motor vehicle, having a first drive assembly, a second drive assembly, and a wheel axle having a first axle member and a second axle member, wherein the axle members are arranged in the lengthwise direction relative to an axis of rotation of the first axle member and/or the second axle member, at least partially, on sides of the first drive assembly and the second drive assembly lying opposite one another. In this case, the first axle member is coupled to the first drive assembly and the second axle member is coupled to the second drive assembly, for transmitting torque. The first drive assembly and the second drive assembly in this case are arranged axis-parallel to each another.

In addition, is provided that the drive device has a first transmission for transmitting torque between the first drive assembly and the first axle member and a second transmission for transmitting torque between the second drive assembly and the second axle member, wherein the first transmission and the second transmission are each formed as a spur or helical gear transmission with at least one transmission stage. A displacement of the first axle member relative to the first drive assembly in the crosswise direction with respect to the axis of rotation of the first axle member can be executed by a specific rotation of the at least one transmission stage of the first transmission, and/or a displacement of the second axle member relative to the second drive assembly in the crosswise direction with respect to the axis of rotation of the second axle member can be executed by a specific rotation of the at least one transmission stage of the second transmission.

The drive device has numerous advantages when compared to the prior art. Due to the fact that the first drive assembly and the second drive assembly are arranged axis-parallel to one another, a packing space requirement for the drive device can be reduced. As a consequence, it is possible to increase a power and/or torque distribution, in particular by use of a suitable transmission, by means of the drive device at the wheel axle of a motor vehicle, wherein a power consumption can be reduced during operation of such a motor vehicle.

In comparison to a drive of the wheel axle with only one drive assembly, the differential is omitted in an advantageous way in the configuration according to the invention. Due to the fact that, in particular, each wheel of the wheel axle is driven separately, a torque vectoring between the wheels can be realized. In addition, a more favorable length/width power ratio of the drive device can be realized, whereby a utilization of same is possible for different motor vehicle classes. Also, cost savings due to synergies are possible, since the drive device can be used in an analogous design both on the front axle and on the rear axle.

The wheel axle is preferably designed as a front axle or a rear axle of a motor vehicle. The first drive assembly and the second drive assembly are preferably drive assemblies that differ from one another. Preferably, the first axle member and the second axle member are different from one another and/or are axle members that are distanced from one another. The first axle member preferably can be operatively connected or is operatively connected to a first wheel of a motor vehicle, in particular rigidly and/or permanently, and the second axle member preferably is or can be operatively connected to a second wheel of the motor vehicle. The wheels are associated with the same wheel axle here. The first drive assembly is set up, in particular, in order to drive the first wheel that can be coupled to the first axle member so as to transmit torque, whereby the second drive assembly is set up, in particular, in order to drive the second wheel that can be coupled to the second axle member so as to transmit torque. The first wheel and the second wheel are preferably wheels of a front axle or of a rear axle of a motor vehicle. It is preferably provided that a first drive device according to the invention is set up for driving a front axle of a motor vehicle, whereby a second drive device according to the invention is set up for driving a rear axle of this motor vehicle.

More preferably, the first drive assembly is coupled or can be coupled to the first axle member in order to transmit torque, in particular, is coupled rigidly and/or permanently, and is decoupled from the second axle member, preferably completely. More preferably, the second drive assembly is coupled or can be coupled to the second axle member in order to transmit torque, in particular, is coupled rigidly and/or permanently, and is decoupled from the first axle member, preferably completely.

According to an enhancement of the invention, it is provided that the first drive assembly and the second drive assembly are arranged in alignment in the crosswise direction relative to the axis of rotation of the first axle member or the second axle member, more preferably, of the first axle member and the second axle member. The crosswise direction relative to the axis of rotation of the first axle member and/or the second axle member is preferably a direction that runs essentially parallel to a plane on which a motor vehicle stands or travels. Preferably, the crosswise direction runs in the horizontal direction. Due to the flush arrangement of the first drive assembly and the second drive assembly, a particularly compact arrangement of same can be realized, which leads to a reduction in the required packing space.

According to an enhancement of the invention, it is provided that a first drive shaft of the first drive assembly and a second drive shaft of the second drive assembly are each arranged parallel to the axis of rotation of the first axle member or the second axle member, more preferably to the first axle member and the second axle member. Preferably, the first drive shaft and the second drive shaft are drive shafts that differ from one another. Preferably, the first drive shaft and the second drive shaft are each designed as rotor shafts of an electric motor. Due to this arrangement of the first drive shaft and the second drive shaft, a particularly compact configuration of the drive device can be realized, which leads in an advantageous way to a reduced packing space requirement.

According to the invention, it is provided that the drive device has a first transmission for transmitting torque between the first drive assembly and the first axle member. It is additionally provided that the drive device has a second transmission for transmitting torque between the second drive assembly and the second axle member. Preferably, in this case, the first transmission and the second transmission are transmissions that differ from one another. In this way, the drive device can be adapted to specific requirements for an application of same in motor vehicles, in particular with respect to transmitting torque, whereby a use in different types of motor vehicles is simplified and therefore, costs can be reduced.

The invention provides that the first transmission and the second transmission are each formed as a spur or helical gear transmission with at least one transmission stage. Thus, the first transmission and the second transmission are each formed as a spur or helical gear transmission with at least one transmission stage. More preferably, the first transmission and the second transmission are each formed as a spur or helical gear transmission with two transmission stages. A secure torque transmission can be realized in a technologically sophisticated and cost-effective way by means of the spur or helical gear transmission.

The invention also provides that a displacement of the first axle member relative to the first drive assembly in the crosswise direction with respect to the axis of rotation of the first axle member can be executed by a specific rotation of the at least one transmission stage of the first transmission. Alternatively or additionally, it is provided that a displacement of the second axle member relative to the second drive assembly in the crosswise direction with respect to the axis of rotation of the second axle member can be executed by a specific rotation of the at least one transmission stage of the second transmission. Preferably, the first axle member and the second axle member can each be displaced independent of one another. In particular, the crosswise direction relative to the axis of rotation of the first axle member and/or the second axle member is a direction that runs in a lengthwise direction and/or in a height direction of a motor vehicle in which the drive device is installed.

In a preferred embodiment of the drive device, the first transmission has two transmission stages, whereby a displacement of the first axle member by a specific rotation of a first of the two transmission stages and/or a second of the two transmission stages, and/or of both transmission stages of the first transmission can be executed. Alternatively or additionally, the second transmission has two transmission stages, whereby a displacement of the second axle member by a specific rotation of a first of the two transmission stages and/or a second of the two transmission stages, and/or of both transmission stages of the second transmission can be executed. It is preferably provided that a specific rotation each time of all transmission stages of the first transmission and/or the second transmission can be carried out, whereby alternatively a specific rotation of a subset of the respective transmission stages of the first and/or second transmission can be carried out. In this way, the first axle member and/or the second axle member can be displaced freely in a specific region in relation to the first and/or the second drive assembly. Therefore, the integration of the drive device according to the invention in motor vehicles of different configuration and having different packing space designs can be simplified.

Another configuration of the invention provides that the first drive assembly and the second drive assembly are each designed as electric motors. By means of drive assemblies that are designed as electric motors, it is possible in an advantageous way to realize a torque vectoring between the axle members driven by the electric motors.

The object is also achieved, in particular, by creating a motor vehicle having at least one drive device. More preferably, a motor vehicle having at least one drive device is created according to one of the above-described embodiments. In particular, the advantages that have already been explained in connection with the drive device according to the invention also result in connection with the motor vehicle. In this case, the drive device has a first drive assembly, a second drive assembly, and a wheel axle having a first axle member and a second axle member. The axle members are arranged here in the lengthwise direction relative to an axis of rotation of the first axle member and/or the second axle member, at least partially, on sides of the first drive assembly and the second drive assembly lying opposite to one another. The first axle member is coupled to the first drive assembly so that torque is transmitted, whereby the second axle member is coupled to the second drive assembly so that torque is transmitted. The first drive assembly and the second drive assembly in this case are arranged axis-parallel to each another.

An enhancement of the invention provides that the two drive assemblies are arranged behind one another in the lengthwise direction of the motor vehicle.

Preferably, the first drive assembly and the second drive assembly, in particular, are arranged directly in succession, thus directly adjacent to one another in the lengthwise direction of the motor vehicle. The lengthwise direction of the motor vehicle is preferably a direction that points, in particular, in the travel direction of the motor vehicle when the vehicle is driven straight ahead. In particular, the lengthwise direction of the motor vehicle points from a front of the motor vehicle to a rear of same, or vice versa. By means of this arrangement, a particularly compact arrangement of the two drive assemblies is realized, whereby a packing space required for the drive device is reduced.

Another embodiment of the invention provides that the first drive assembly and the second drive assembly are arranged on a spring-suspended subframe relative to a body of the motor vehicle. In particular, the subframe is set up in order to bear the drive device according to the invention, whereby, in particular, the drive device is articulated or suspended over the subframe, preferably by means of springs on the body of the motor vehicle, or is engaged on the body. By means of the arrangement of the first drive assembly and the second drive assembly in the subframe, a particularly modular configuration of the drive device is realized, whereby a multiple use in different types of motor vehicles is simplified, which leads to reductions in cost.

BRIEF DESCRIPTION OF THE FIGURES

The invention will be explained in further detail in the following on the basis of the drawing, without resulting in any limitation of the invention. Here.

DETAILED DESCRIPTION OF THE FIGURES

Figure 1:
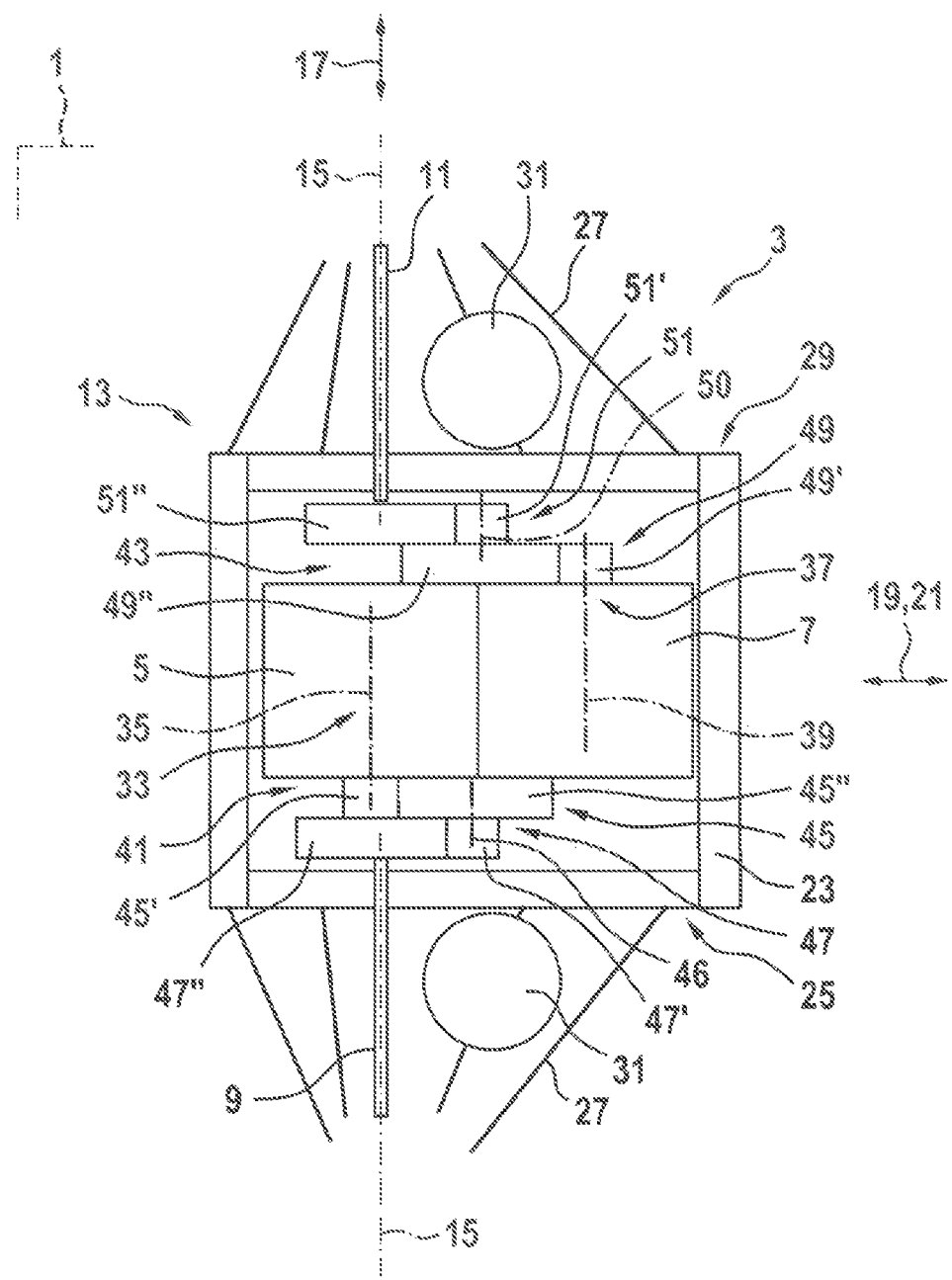
FIG. 1 shows a schematic representation of a drive device in a motor vehicle in a top view.

FIG. 1 shows schematically a motor vehicle 1. The motor vehicle 1 has at least one drive device 3, and in the exemplary embodiment according to FIG. 1, precisely one drive device 3. The drive device 3 has a first drive assembly 5, a second drive assembly 7, and a wheel axle 13 having a first axle member 9 and a second axle member 11. The axle members 9, 11 are arranged in the lengthwise direction relative to an axis of rotation 15 of the first axle member 9 and/or the second axle member 11, at least partially, on opposite-lying sides of the first drive assembly 5 and the second drive assembly 7. The lengthwise direction relative to the axis of rotation 15 is characterized by a double arrow, which is labeled by the reference number 17. In an alternative example of embodiment, which is not shown in FIG. 1, the axes of rotation 15 of the first axle member 9 and the second axle member 11 are formed so as to be offset in parallel relative to one another.

The first axle member 9 is coupled to the first drive assembly 5 so that torque is transmitted. Preferably, the first axle member 9 is designed and set up as the first driven shaft of the drive device 3 in order to effect a torque transmission between the first drive assembly 5 and a first wheel—not shown in FIG. 1—of the motor vehicle 1. The second axle member 11 is coupled to the second drive assembly 7 so that torque is transmitted. Preferably, the second axle member 11 is designed and set up as the second driven shaft of the drive device 3 in order to effect a torque transmission between the second drive assembly 7 and a second wheel—not shown in FIG. 1—of the motor vehicle 1. The first drive assembly 5 and the second drive assembly 7 are arranged axis-parallel to each another.

In a preferred exemplary embodiment of the motor vehicle 1, the drive device 3 is designed to drive a front axle of the motor vehicle 1. Alternatively, the drive device 3 is preferably designed to drive a rear axle of the motor vehicle 1. In another preferred exemplary embodiment of the motor vehicle 1, the motor vehicle 1 has two drive devices 3, wherein a first drive device 3 is set up to drive the front axle of the motor vehicle 1, and whereby a second drive device 3 is set up to drive a rear axle of the motor vehicle 1.

Preferably, the two drive assemblies 5, 7—as shown in FIG. 1—are arranged behind one another in the lengthwise direction of the motor vehicle 1. The lengthwise direction of the motor vehicle 1 is shown by a double arrow provided with the reference number 19.

Preferably, the first drive assembly 5 and the second drive assembly 7 are arranged in alignment in the crosswise direction relative to the axis of rotation 15 of the first axle member 9 and/or the second axle member 11. The crosswise direction relative to the axis of rotation 15 of the first axle member 9 and/or the second axle member 11 is more preferably a direction according to a double arrow characterized by the reference number 21. Alternatively, the crosswise direction is preferably a direction that encloses an angle different from 0° with the image plane of FIG. 1. In the exemplary embodiment according to FIG. 1, the crosswise direction 21 relative to the axis of rotation 15 coincides with the lengthwise direction 19 of the motor vehicle 1.

The first drive assembly 5 and the second drive assembly 7 here are arranged on a spring-suspended subframe 23 relative to a body—not shown in FIG. 1—of the motor vehicle 1. The subframe 23 is supported on a first side 25 thereof, on which the first axle member 9 is arranged, by a plurality of links 27, four links 27 here, of which only one link 27 is provided with a reference number for better clarity, and is preferably coupled to the body of the motor vehicle 1. The drive assemblies 5, 7 are thus coupled to the body only by way of the subframe 23. Moreover, the subframe 23 is supported on a second side 29 thereof, on which the second axle member 11 is arranged, by a plurality of links 27, four links 27 here, of which only one link 27 is provided with a reference number for better clarity, and preferably coupled to the body of the motor vehicle 1. The subframe 23 is spring-suspended by means of a number of springs 31, two springs 31 here, relative to the body of the motor vehicle 1. Here, in particular, the drive device 3 is spring-suspended relative to the body of the motor vehicle 1, by way of the subframe 23.

The first drive assembly 5 here has a first drive shaft 33—not shown in FIG. 1; rather, it is shown schematically by a dot-dash line 35. The second drive assembly 7 here has a second drive shaft 37—not shown in FIG. 1; rather, it is shown schematically by a dot-dash line 39. The first drive shaft 33 of the first drive assembly 5 and the second drive shaft 37 of the second drive assembly 7 are here each parallel to the axis of rotation 15 of the first axle member 9 and/or the second axle member 11.

The drive device 3 has a first transmission 41 for transmitting torque between the first drive assembly 5 and the first axle member 9. Alternatively or additionally—additionally in the exemplary embodiment shown here—the drive device 3 has a second transmission 43 for transmitting torque between the second drive assembly 7 and the second axle member 11.

The first transmission 41 and the second transmission 43 are each formed as a spur or helical gear transmission with at least one transmission stage. In the exemplary embodiment according to FIG. 1, the first transmission 41 and the second transmission 43 are each formed as a spur or helical gear transmission with two transmission stages.

The first transmission 41 has here a first transmission stage 45. The first transmission stage 45 has a first pinion 45' that is coupled to the first drive shaft 33 in order to transmit torque. An axis of rotation of the first pinion 45' runs here along the dot-dash line 35 and hence corresponds to the axis of rotation of the first drive shaft 33. In addition, the first transmission stage 45 has a second pinion 45", which meshes with the first pinion 45'. The second pinion 45" has an axis of rotation, which is shown by a dot-dash line 46 in FIG. 1.

In addition, the first transmission 41 has a second transmission stage 47. The second transmission stage 47 has a first pinion 47', which is coupled to the second pinion 45" in order to transmit torque. An axis of rotation of the first pinion 47' is here the same as axis of rotation of the second pinion 45", thus the axis of rotation 46. In addition, the second transmission stage 47 has a second pinion 47'", which meshes with the first pinion 47'. The second pinion 47" is coupled to the first axle member 9 in order to transmit torque, wherein an axis of rotation of the second pinion 47" is here the same as the axis of rotation 15 of the first axle member 9.

The structure of the second transmission 43 is preferably configured analogously to the structure of the first transmission 41. The second transmission 43 has here a first transmission stage 49. The first transmission stage 49 has a first pinion 49' that is coupled to the second drive shaft 37 in order to transmit torque. An axis of rotation of the first pinion 49' runs here along the dot-dash line 39 and hence corresponds to the axis of rotation of the second drive shaft 37. In addition, the first transmission stage 49 has a second pinion 49", which meshes with the first pinion 49'. The second pinion 49" has an axis of rotation, which is shown by a dot-dash line 50 in FIG. 1.

In addition, the second transmission 43 has a second transmission stage 51. The second transmission stage 51 has a first pinion 51', which is coupled to the second pinion 49" in order to transmit torque. An axis of rotation of the first pinion 51' is here the same as the axis of rotation of the second pinion 49", thus the axis of rotation 50. In addition, the second transmission stage 51 has a second pinion 51", which meshes with the first pinion 51'. The second pinion 51" is coupled to the second axle member 11 in order to transmit torque, wherein an axis of rotation of the second pinion 51" is here the same as the axis of rotation 15 of the second axle member 11.

The first drive assembly 5 and the second drive assembly 7 are each preferably designed as electric motors. Preferably, the first drive shaft 33 and the second drive shaft 37 are then each designed as rotor shafts.

Figure 2:
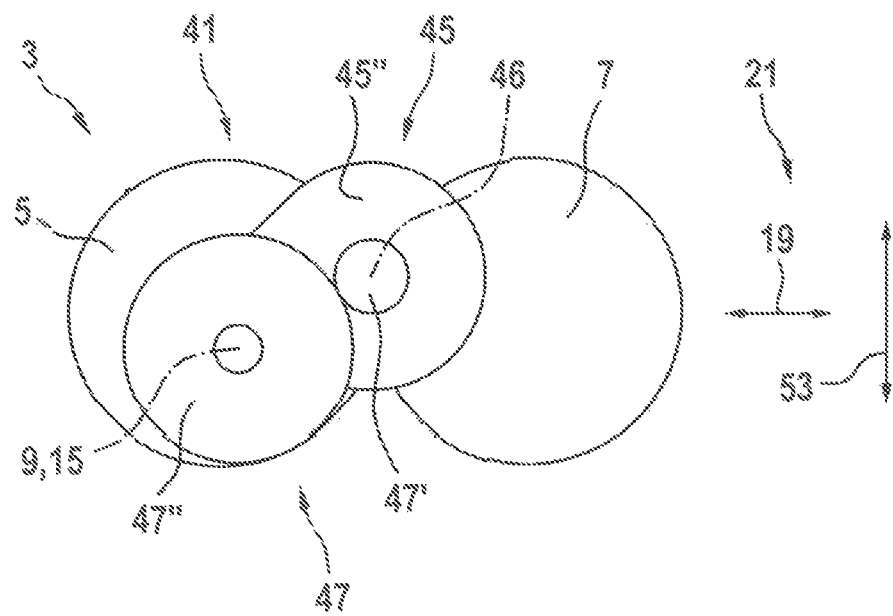
FIG. 2 shows a schematic representation of the drive device with a transmission in a first operating position, in a lateral view.

FIG. 2 shows schematically the drive device 3 with a transmission in a first operating position, in a lateral view. The transmission involves the first transmission 41 by way of example. What is stated in the following relative to this exemplary embodiment, however, can also be transferred analogously to a corresponding exemplary embodiment with the second transmission 43. The same applies to the description of the embodiment examples according to FIGS. 3 and 4, which can also be transferred analogously to corresponding embodiment examples with the second transmission 43. Identical and functionally identical elements are provided with the same reference numbers, so that reference is made to the previous description in this regard.

In the exemplary embodiment according to FIG. 2, a displacement of the first axle member 9 can be executed relative to the first drive assembly 5 in the crosswise direction 21 with respect to the axis of rotation 15 of the first axle member 9, wherein, in FIG. 2, the axis of rotation 15 runs orthogonal to the image plane of FIG. 2—from the view of the observer—through a specific rotation of the at least one transmission stage 45, 47 of the first transmission 41. The crosswise direction 21 relative to the axis of rotation 15 of the first axle member 9 is preferably a direction that has as components, in particular, the lengthwise direction 19 and/or a height direction of the motor vehicle 1, which is shown in FIG. 2 by a double arrow provided with the reference number 53. The height direction 53, in particular, is orthogonal to a plane—not shown in FIG. 2—on which the motor vehicle 1 stands or travels.

The specific rotation of the first transmission stage 45 can be executed with the first pinion 45'—not shown in FIG. 2—and the second pinion 45", in particular around the axis of rotation 35. The specific rotation of the second transmission stage 47 can be executed with the first pinion 47' and the second pinion 47", in particular around the axis of rotation 46. Of course, it results from this that the first axle member 9 can be executed in the crosswise direction 21 relative to the first drive assembly 5 with respect to the axis of rotation 15 of the first axle member 9, hence in the lengthwise direction 19 and/or in the height direction 53.

Alternatively or additionally, in an analogous way, a displacement of the second axle member 11 relative to the second drive assembly 7 can be executed in the crosswise direction 21 relative to the axis of rotation 15 of the second axle member 11 by a specific rotation of the at least one transmission stage, thus the first transmission stage 49 and/or the second transmission stage 51 of the second transmission 43. This displacement of the second axle member 11 relative to the second drive assembly 7 takes place analogously to the displacement of the first axle member 9 relative to the first drive assembly 5, which is shown in FIG. 2.

Due to the variable arrangement of the axle members 9, 11 relative to the drive assemblies 5, 7 by means of the described displacement, the drive device 3 can be adapted, in particular, to specific packing space requirements, in particular to a front axle or a rear axle of the motor vehicle 1. In addition, a flexible arrangement or displacement, respectively, of the first axle member 9 and/or the second axle member 11 can be configured as a function of a steering position of the motor vehicle 1.

Figure 3:
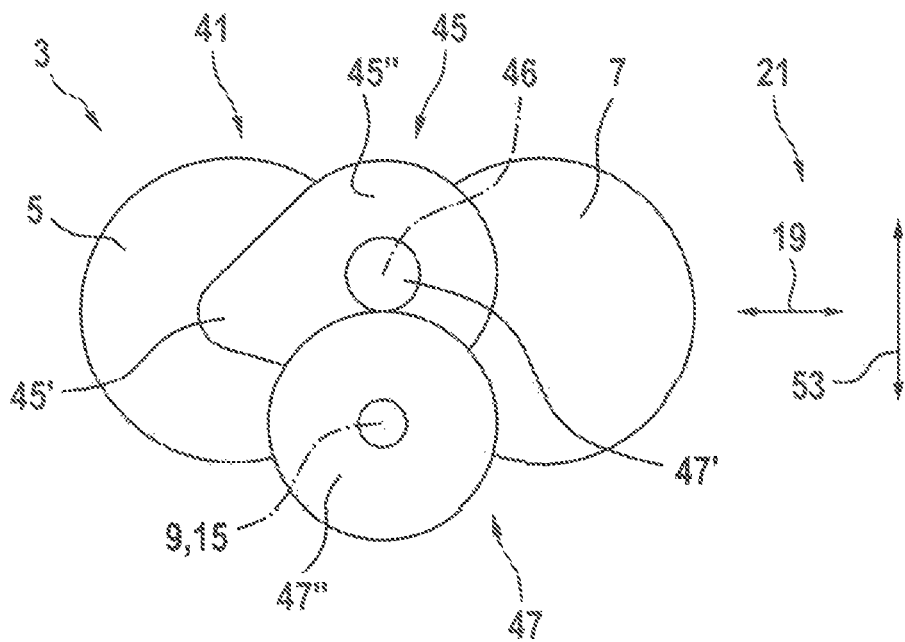
FIG. 3 shows a schematic representation of the drive device with the transmission according to FIG. 2 in a second operating position, in a lateral view.

FIG. 3 shows a schematic representation of the drive device 3 with the first transmission 41 in a second operating position, in a lateral view. Identical and functionally identical elements are provided with the same reference numbers, so that reference is made to the previous description in this regard. The second operating position shown in FIG. 3 differs from the first operating position shown in FIG. 2, inasmuch as the second pinion 47"—as seen by the observer—is displaced around the axis of rotation 46 counterclockwise toward the right in the lengthwise direction 19 and downward in the height direction 53.

Figure 4:
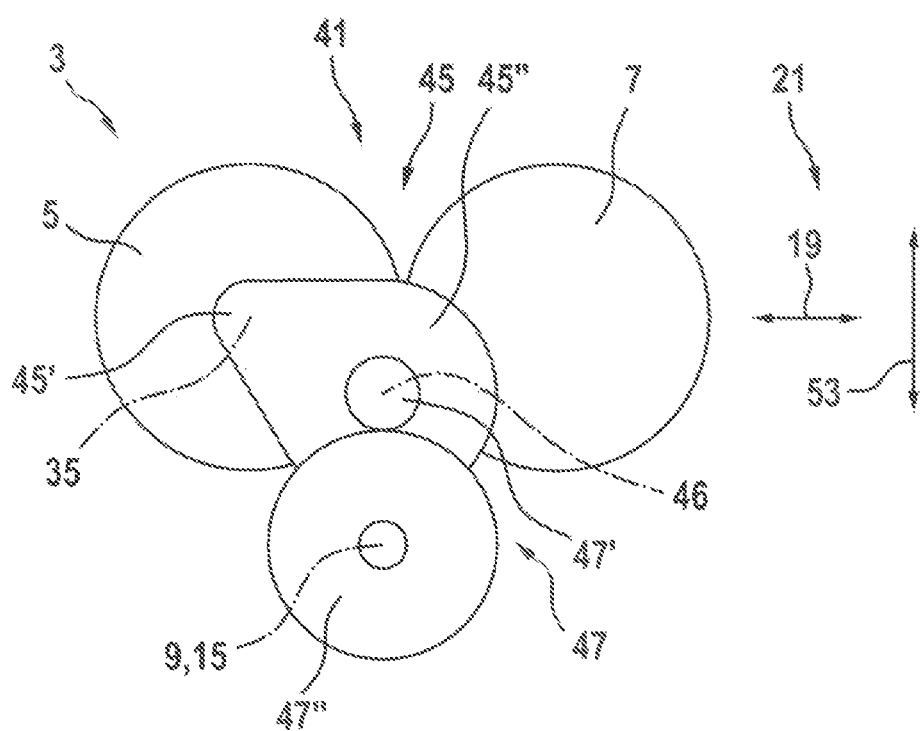
FIG. 4 shows a schematic representation of the drive device with the transmission according to FIGS. 2 and 3 in a third operating position, in a lateral view.

FIG. 4 shows a schematic representation of the drive device 3 with the first transmission 41 in a third operating position, in a lateral view. Identical and functionally identical elements are provided with the same reference numbers, so that reference is made to the previous description in this regard. The third operating position shown in FIG. 4 differs from the second operating position shown in FIG. 3 essentially by the fact that the second pinion 45" is displaced in the clockwise direction relative to the first pinion 45' around the axis of rotation 35—as seen by the observer. This brings about, in particular, a displacement of the first axle member 9 relative to the first drive assembly 5 in the crosswise direction 21, wherein in FIG. 4, in particular, a displacement of the first axle member 9 in the height direction 53 is executed downward—as seen by the observer.

Overall, it is shown that the packing space necessary for the drive device 3 can be significantly reduced by the axis-parallel arrangement of the first drive assembly 5 and the second drive assembly 7. In particular, additional functions and equipment necessary for this can therefore be incorporated into a motor vehicle 1 having the drive device 3. In addition, the costs of the drive device 3 and a motor vehicle 1 having the drive device 3 can be reduced thereby.

The invention claimed is:

1. A drive device for a motor vehicle, comprising:
   a first drive assembly,
   a second drive assembly, and
   a wheel axle having a first axle member and a second axle member,
   wherein the axle members are arranged in a lengthwise direction relative to an axis of rotation of at least one of the first axle member and the second axle member on sides of the first drive assembly and the second drive assembly lying opposite to one another,
   wherein the first axle member is coupled to the first drive assembly and the second axle member is coupled to the second drive assembly so that torque is transmitted,
   wherein the first drive assembly and the second drive assembly are arranged axis-parallel to each another,
   wherein the drive device has a first transmission for transmitting torque between the first drive assembly and the first axle member and a second transmission for transmitting torque between the second drive assembly and the second axle member,
   wherein the first transmission and the second transmission are each designed as a spur or helical gear transmission with at least one transmission stage, and
   wherein a displacement of the first axle member relative to the first drive assembly is executed in a crosswise direction with respect to the axis of rotation of the first axle member by a rotation of the at least one transmission stage of the first transmission, or in that a displacement of the second axle member relative to the second drive assembly is executed in the crosswise direction with respect to the axis of rotation of the second axle member by a rotation of the at least one transmission stage of the second transmission.

2. The drive device according to claim 1, wherein the first drive assembly and the second drive assembly are arranged in alignment in the crosswise direction relative to the axis of rotation of at least one of the first axle member and the second axle member.

3. The drive device according to claim 1, wherein a first drive shaft of the first drive assembly and a second drive shaft of the second drive assembly are each arranged parallel to the axis of rotation of at least one of the first axle member and the second axle member.

4. The drive device according to claim 1, wherein the first drive assembly and the second drive assembly are each designed as electric motors.

5. A motor vehicle, having at least one drive device, comprising:
   the drive device has a first drive assembly, a second drive assembly, and a wheel axle having a first axle member and a second axle member,
   wherein the axle members are arranged in a lengthwise direction relative to an axis of rotation of at least one of the first axle member and the second axle member on sides of the first drive assembly and the second drive assembly lying opposite to one another,
   wherein the first axle member is coupled to the first drive assembly and the second axle member is coupled to the second drive assembly so that torque is transmitted,
   wherein the first drive assembly and the second drive assembly are arranged axis-parallel to each another,
   wherein the drive device has a first transmission for transmitting torque between the first drive assembly and the first axle member and a second transmission for transmitting torque between the second drive assembly and the second axle member,
   wherein the first transmission and the second transmission are each designed as a spur or helical gear transmission with at least one transmission stage,
   wherein a displacement of the first axle member relative to the first drive assembly is executed in a crosswise direction with respect to the axis of rotation of the first axle member by a rotation of the at least one transmission stage of the first transmission, or in that a displacement of the second axle member relative to the second drive assembly is executed in the crosswise direction respect to the axis of rotation of the second axle member by a rotation of the at least one transmission stage of the second transmission.

6. The motor vehicle according to claim 5, wherein the two drive assemblies are arranged behind one another in a lengthwise direction of the motor vehicle.

7. The motor vehicle according to claim 5, wherein the first drive assembly and the second drive assembly are arranged on a spring-suspended subframe relative to a body of the motor vehicle.

* * * * *